(12) United States Patent
Pastoors et al.

(10) Patent No.: US 10,871,206 B2
(45) Date of Patent: Dec. 22, 2020

(54) TORQUE TRANSMISSION DEVICE

(71) Applicant: BorgWarner Inc., Auburn Hills, MI (US)

(72) Inventors: Stefan Pastoors, Edingen-Neckarhausen (DE); Matthias Gerhard Veit, Oftersheim (DE)

(73) Assignee: Borg Warner Inc., Auburn Hills, MI (US)

( * ) Notice: Subject to any disclaimer, the term of this patent is extended or adjusted under 35 U.S.C. 154(b) by 162 days.

(21) Appl. No.: 15/946,040

(22) Filed: Apr. 5, 2018

(65) Prior Publication Data
US 2018/0291986 A1 Oct. 11, 2018

(30) Foreign Application Priority Data

Apr. 5, 2017 (DE) .................. 10 2017 003 325

(51) Int. Cl.
| | | |
|---|---|---|
| *F16H 3/78* | (2006.01) | |
| *F16D 25/06* | (2006.01) | |
| *F16H 57/10* | (2006.01) | |
| *F16D 7/02* | (2006.01) | |
| *F16H 3/54* | (2006.01) | |

(52) U.S. Cl.
CPC .............. *F16H 3/78* (2013.01); *F16D 7/027* (2013.01); *F16D 25/06* (2013.01); *F16H 3/54* (2013.01); *F16H 57/10* (2013.01); *F16H 2200/2005* (2013.01); *F16H 2200/2064* (2013.01); *F16H 2200/2094* (2013.01)

(58) Field of Classification Search
CPC .............. F16H 3/54; F16H 2200/2005; F16H 2200/2064; F16H 3/78; F16H 1/36; F16D 7/027; F16D 11/14; F16D 13/52; F16D 2021/0661
See application file for complete search history.

(56) References Cited

U.S. PATENT DOCUMENTS

| | | | | |
|---|---|---|---|---|
| 3,048,247 A | * | 8/1962 | Cook | F16D 23/04 192/53.32 |
| 3,754,625 A | * | 8/1973 | Voth | B60K 17/046 192/221.1 |
| 5,435,793 A | * | 7/1995 | Varela | B60K 17/046 180/244 |
| 5,525,115 A | * | 6/1996 | Vanzini | F16H 3/54 475/146 |
| 5,645,148 A | * | 7/1997 | Saurin | B60K 17/046 188/106 F |
| 5,711,740 A | * | 1/1998 | Bakowski | B60K 17/344 180/247 |
| RE41,285 E | * | 4/2010 | Kingston | B60K 17/046 475/323 |

(Continued)

*Primary Examiner* — Stacey A Fluhart
(74) *Attorney, Agent, or Firm* — Howard & Howard Attorneys PLLC

(57) ABSTRACT

The present invention relates to a torque transmission device (2) comprising a planetary gear train (22), which has a rotatable component (28), a stationary housing (18), and a clutch device (32) for selective coupling of the component (28) with the stationary housing (18). The clutch device (32) has a friction-locking first clutch (34) and a positive-locking second clutch (36), wherein the component (28) may be coupled to the stationary housing (18) via the first clutch (34) before a coupling by means of the second clutch (36).

18 Claims, 12 Drawing Sheets

(56) References Cited

U.S. PATENT DOCUMENTS

Figure 1:
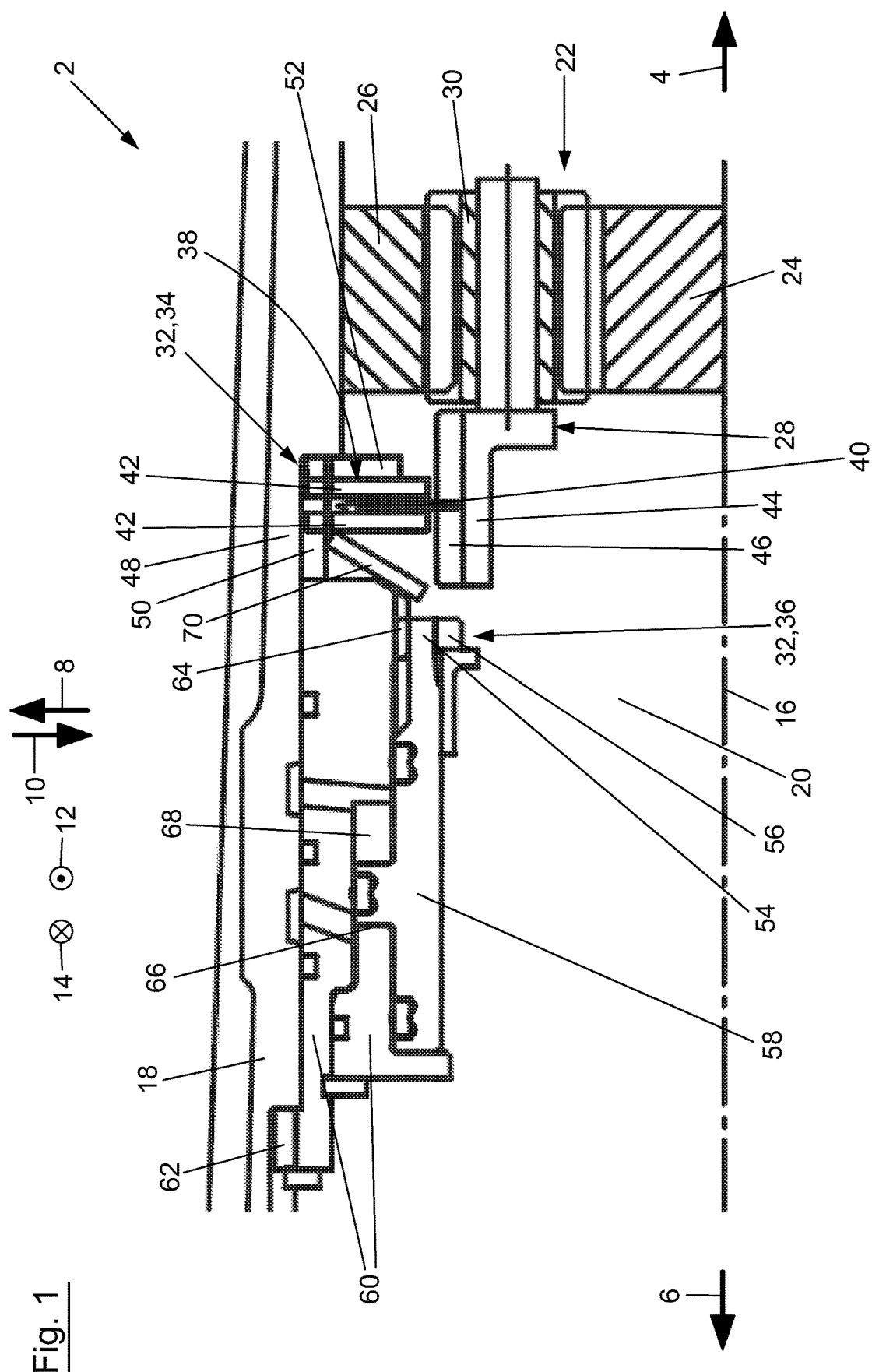

| | | | |
|---|---|---|---|
| 2002/0117860 A1* | 8/2002 | Man | B60K 6/387 290/46 |
| 2008/0081726 A1* | 4/2008 | Saito | B60K 17/3467 475/331 |
| 2017/0241486 A1* | 8/2017 | Pritchard | B60K 17/02 |

* cited by examiner

TORQUE TRANSMISSION DEVICE

CROSS-REFERENCE TO RELATED APPLICATIONS

This application claims the benefit of German Patent Application No. 102017003325.0 filed Apr. 5, 2017, the disclosure of which is herein incorporated by reference in its entirety.

DESCRIPTION

The present invention relates to torque transmission devices comprising a planetary gear train, which has a rotatable component, a stationary housing, and a clutch device for selective coupling of the component with the stationary housing.

Automatic transmissions are known from practice in which torque transmission devices are used. The known torque transmission devices have a planetary gear train, which has a rotatable component, thus, for example, a sun gear, a ring gear, or a planet gear carrier with at least one planet gear arranged thereon. In addition, the known torque transmission devices have a stationary housing, which may be formed, for example, by a transmission housing. Furthermore, a clutch device is provided which functions for selective coupling of the component of the planetary gear train with the stationary housing. In general, frictionally-engaged disk clutches or brakes, frictionally-engaged belt brakes, or clamping element freewheels, or overrunning clutches are thereby used as clutch devices for selective coupling of the component with the stationary housing.

The known torque transmission devices have been proven; however, they are worth improving with respect to high density and good controllability and synchronization.

It is therefore the object of the present invention to refine a torque transmission device of the generic type so that this both guarantees a secure coupling of the component with the stationary housing and also ensures a rapid speed synchronization and controllability.

This problem is solved by the features listed in claim 1. Advantageous embodiments of the invention are the subject matter of the subclaims.

The torque transmission device according to the invention, which is preferably designed for use in an automatic transmission, has a planetary gear train, wherein the planetary gear train has a rotatable component. The rotatable component may be, for example, the sun gear, the ring gear, or the planet gear carrier of the planetary gear train. In addition, the torque transmission device has a stationary housing, which is consequently designed to be non-rotatable. It is hereby preferred if one other of the components of the planetary gear train, thus, for example, the sun gear, the ring gear, or the planet gear carrier, is rotationally fixed on the stationary housing or is even designed as one piece with the same. Furthermore, the torque transmission device has a clutch device. Even if a clutch device is always discussed here, the clutch device may also be designated as a brake device, particularly as this is designed for selective coupling of the component with the stationary housing. The specified clutch device has a friction-locking first clutch and a positive-locking second clutch. The first and second clutches are thereby designed in such a way that the component of the planetary gear train may be coupled to the stationary housing via the first clutch before a coupling by means of the second clutch. In other words, the component may be initially coupled to the stationary housing via the friction-locking first clutch, by which means the component of the planetary gear train may be initially decelerated using slip in order to achieve matching of the speed of the rotating component of the planetary gear train to the stationary housing via the friction-locking first clutch. Following this, the component of the planetary gear train may be coupled in a positive locking way to the stationary housing via the positive-locking second clutch in order to be able to support particularly securely a high torque acting on the component of the planetary gear train at the stationary housing.

In one preferred embodiment of the torque transmission device according to the invention, the first clutch and the second clutch are interdependently actuatable. Thus, for example, the positive-locking second clutch may only be transferred into the coupling position if the friction locking-first clutch has been transferred into its coupling position. This simplifies the actuation of the clutch device; also, the design of the clutch device and the complexity of the control may also be simplified by this means. Thus, for example, only one actuating element may be provided for both clutches, as this will be addressed again later.

In one particularly preferred embodiment of the torque transmission device according to the invention, the first clutch and the second clutch are independently actuatable, in contrast to the previously described embodiment. This embodiment is advantageous in that the positive-locking second clutch may be transferred into its coupling position without previously transferring the friction-locking first clutch into its coupling position. This may be useful, for example, in an operating state of the torque transmission device in which the rotatable component of the planetary gear train does not rotate or rotates only at a low speed relative to the stationary housing, as is the case, for example, when a motor vehicle is stopped. Thus, a positive locking connection may be quickly achieved via the positive-locking second clutch using a clutch device designed in this way. Independent of this, there remains, however, the possibility of coupling the component to the stationary housing via the first clutch before a coupling by means of the second clutch, when the component of the planetary gear train rotates at an increased speed relative to the stationary housing. Overall, a torque transmission device comprising a first clutch and a second clutch, which are independently actuatable, may thus be used significantly more flexibly.

In one advantageous embodiment of the torque transmission device according to the invention, the first clutch and the second clutch are actuatable via a common actuating element. The common actuating element may be driven basically in any way; however, it is additionally preferred in this embodiment if the common actuating element is designed as a hydraulically-drivable actuating piston. A common actuating element simplifies the design of the clutch device, thus the entire torque transmission device. A common actuating element is then particularly advantageous if the first clutch and the second clutch should be interdependently actuatable.

In another advantageous embodiment of the torque transmission device according to the invention, which represents an alternative to the previously-described embodiment, the first clutch is actuatable via a first actuating element and the second clutch is actuatable via a second actuating element in order to facilitate in particular an independent actuation of the first clutch and the second clutch. It is thereby preferred if the first actuating element and the second actuating element are each designed as hydraulically-drivable actuating pistons.

In one particularly advantageous embodiment of the torque transmission device according to the invention, the first actuating element, in the form of the first actuating piston, has a piston working surface, upon which hydraulic pressure may be applied, which is greater than a piston working surface of the second actuating piston, upon which hydraulic pressure may be applied. By this means, the fact is taken into account that a lower actuating force is generally necessary to hold the positive locking clutch in its coupling position. Due to the smaller piston working surface of the second actuating piston, a second actuating piston with smaller dimensions may be used to achieve a compact design of the clutch device inside of the torque transmission device.

To achieve a particularly compact design of the coupling device inside of the torque transmission device, the first actuating piston and the second actuating piston are arranged nested in the radial direction in another advantageous embodiment of the torque transmission device according to the invention. This achieves in particular a particularly short axial installation length. Alternatively or supplementally, the first actuating piston and the second actuating piston are arranged flush with one another in the axial direction, thus, in their movement direction.

According to another advantageous embodiment of the torque transmission device according to the invention, the first actuating piston and/or the second actuating piston is designed as an annular piston.

According to another preferred embodiment of the torque transmission device according to the invention, a first pressure chamber is assigned to the first actuating piston and a second pressure chamber is assigned to the second actuating piston, said pressure chambers drive or actuate the respective actuating piston through the application of pressure. To achieve a particularly compact design of the clutch device thereby, the first pressure chamber is preferably at least partially delimited by the second actuating piston. In addition, the first pressure chamber is preferably delimited by the second actuating piston in such a way that a reset force on the second actuating piston may be generated by means of a hydraulic pressure within the first pressure chamber. Alternatively, the second pressure chamber is preferably delimited at least partially by the first actuating piston and a reset force on the first actuating piston may be generated by means of a hydraulic pressure within the second pressure chamber. In both of the specified cases, the reset force achieves a simplified resetting of the second or the first actuating piston from the coupling position into the decoupled position. By this means, any additional reset devices for the respective actuating piston may be unloaded, dimensioned as correspondingly smaller, or completely omitted.

According to another preferred embodiment of the torque transmission device according to the invention, a reset device is assigned to the common actuating element or the first actuating element and/or the second actuating element to reset the same, wherein the reset device preferably has at least one elastic reset element, particularly preferably a spring element.

In another preferred embodiment of the torque transmission device according to the invention, the first clutch is a disk clutch comprising a disk set, a first disk carrier connected rotationally fixedly to the component, and a second disk carrier connected rotationally fixedly to the housing. A disk set may hereby also be understood as a disk set that has at least one disk on the first disk carrier and at least one disk on the second disk carrier, although it is preferred if two or more disks are arranged on at least one of the disk carriers or on both disk carriers. The rotationally fixed connection mentioned above may hereby also be achieved by a one-piece design. Thus, it is particularly preferred in this embodiment if the second disk carrier is designed as one piece with the housing.

In another advantageous embodiment of the torque transmission device according to the invention, the first disk carrier has a first rotary driving contour for first disks of the disk set and the second disk carrier has a second rotary driving contour for second disks of the disk set. The two rotary driving contours preferably each facilitate an axial displaceability of the disks of the disk set respectively arranged thereon.

In another particularly preferred embodiment of the torque transmission device according to the invention, the positive-locking second clutch has a movable coupling element that may be brought into rotary driving engagement with the first and/or second rotary driving contour in order to achieve a positive locking coupling between the component and the stationary housing. Consequently, the positive-locking second clutch uses the already present first and/or second rotary driving contour on the disk carriers of the positive-locking first clutch, by which means a double function is assigned to the rotary driving contour, which further simplifies the design and the manufacturing. In this embodiment, it is additionally preferred if the movable coupling element is permanently in rotary driving connection with the second or first rotary driving contour, whereas it may be brought merely into rotary driving engagement with the first or second rotary driving contour. In this way, the second or first rotary driving contour also functions for guiding the movable coupling element, even if the coupling element has not yet been brought into rotary driving engagement with the other rotary driving contour.

In another preferred embodiment of the torque transmission device according to the invention, the movable coupling element of the second clutch is designed as one piece with the second actuating element or with the common actuating element in order to reduce the number of parts and to achieve a fast activation of the movable coupling element during an actuation via the second actuating element or via the common actuating element.

In another preferred embodiment of the torque transmission device according to the invention, the coupling element of the second clutch is arranged between the first actuating element and the disk set, wherein the coupling element is preferably arranged between the first actuating element and the disk set in the axial direction. In this embodiment, it is additionally preferred if the first actuating element extends to the disk set through at least one window in the coupling element in order to be able to transfer the force of the first actuating element to the disk set in the most direct and space saving way. In this context, it has proven advantageous if the first actuating element has multiple actuating fingers extending through the at least one window in the coupling element.

As already previously presented, it is advantageous if the previously described coupling element is or may be brought into rotary driving engagement with the first rotary driving contour on the one side and with the second rotary driving contour on the other side, in order to achieve a most direct positive-locking coupling between the component and the stationary housing. In one alternative embodiment variant of the torque transmission device, the coupling element is connected rotationally fixedly to the second actuating element or to the common actuating element, wherein the component may be coupled to the stationary housing via the coupling element and the second or common actuating element. Consequently, the coupling is carried out in this embodiment via only one of the two rotary driving contour which may be advantageous, depending on the available installation space. In this case, it should be ensured, however, that the second or common actuating element is already directly or indirectly connected rotationally fixedly to the stationary housing.

In another advantageous embodiment of the torque transmission device according to the invention, the planetary gear train has a sun gear, a ring gear, and a planet gear carrier with at least one planet gear which is in rotary driving engagement with the sun gear and the ring gear. The sun gear, the ring gear, or the planet gear carrier thereby forms the previously mentioned rotatable component of the planetary gear train, wherein it is preferred here if the rotatable component is formed by the planet gear carrier. Furthermore, it is preferred in this embodiment if a second of the specified components is connected rotationally fixedly to the stationary housing, wherein the second component may, if necessary, be the ring gear. Consequently, the clutch device hereby functions not only for coupling the rotatable component to the stationary housing, but also for the selective coupling of the rotatable component with the second component in order to achieve a corresponding switching state of the planetary gear train.

Figure 2:
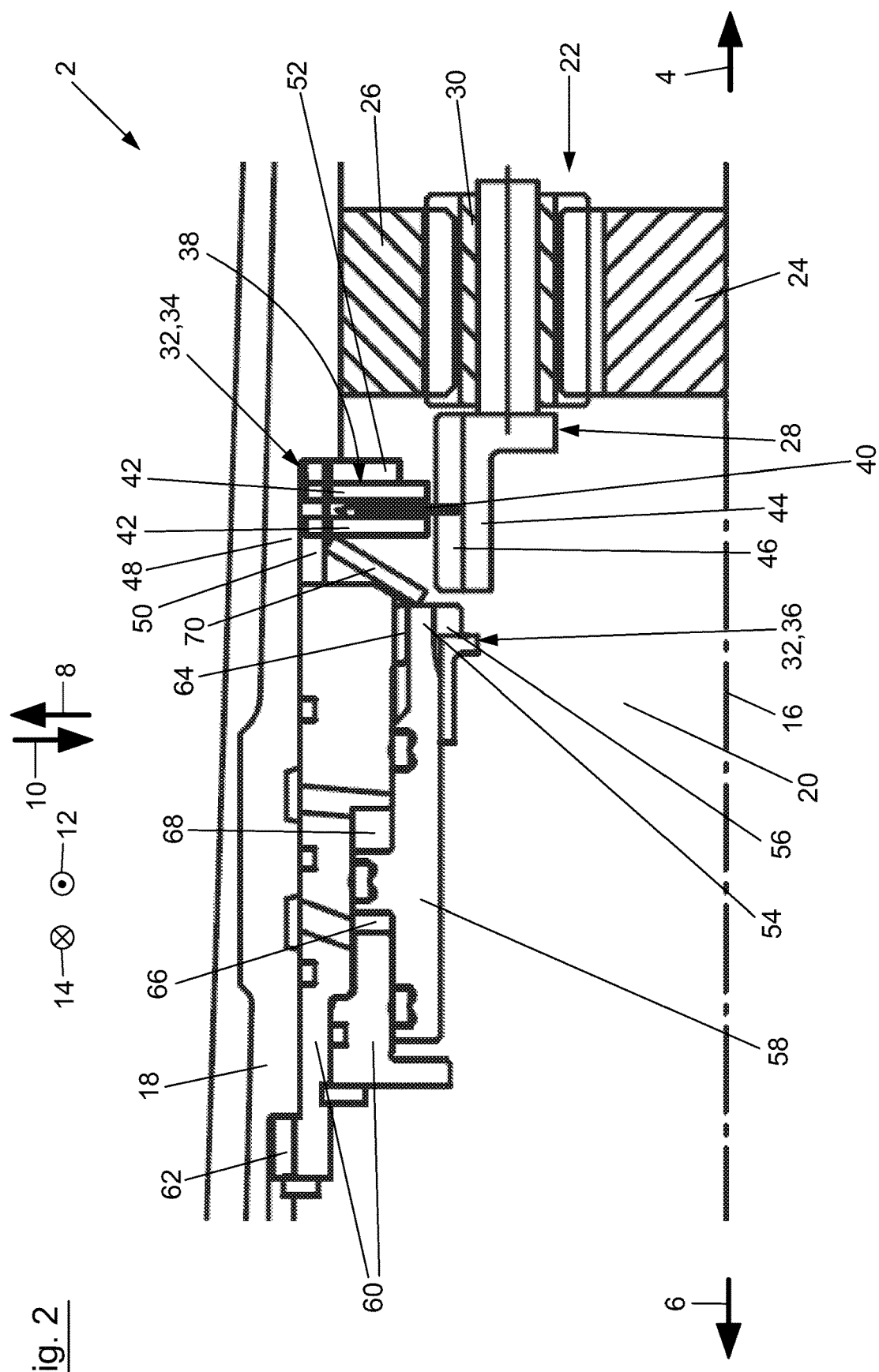
Figure 3:
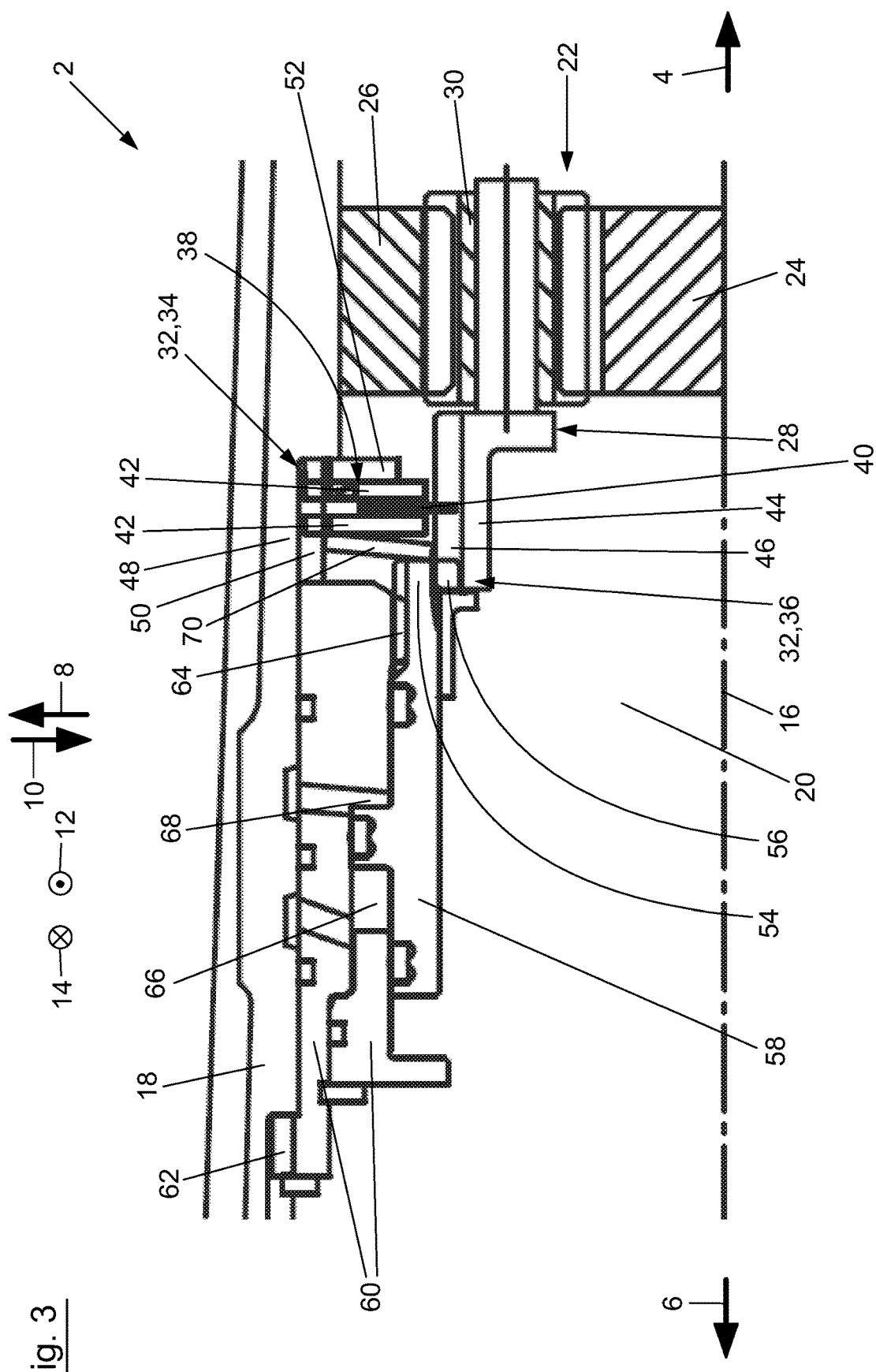
Figure 4:
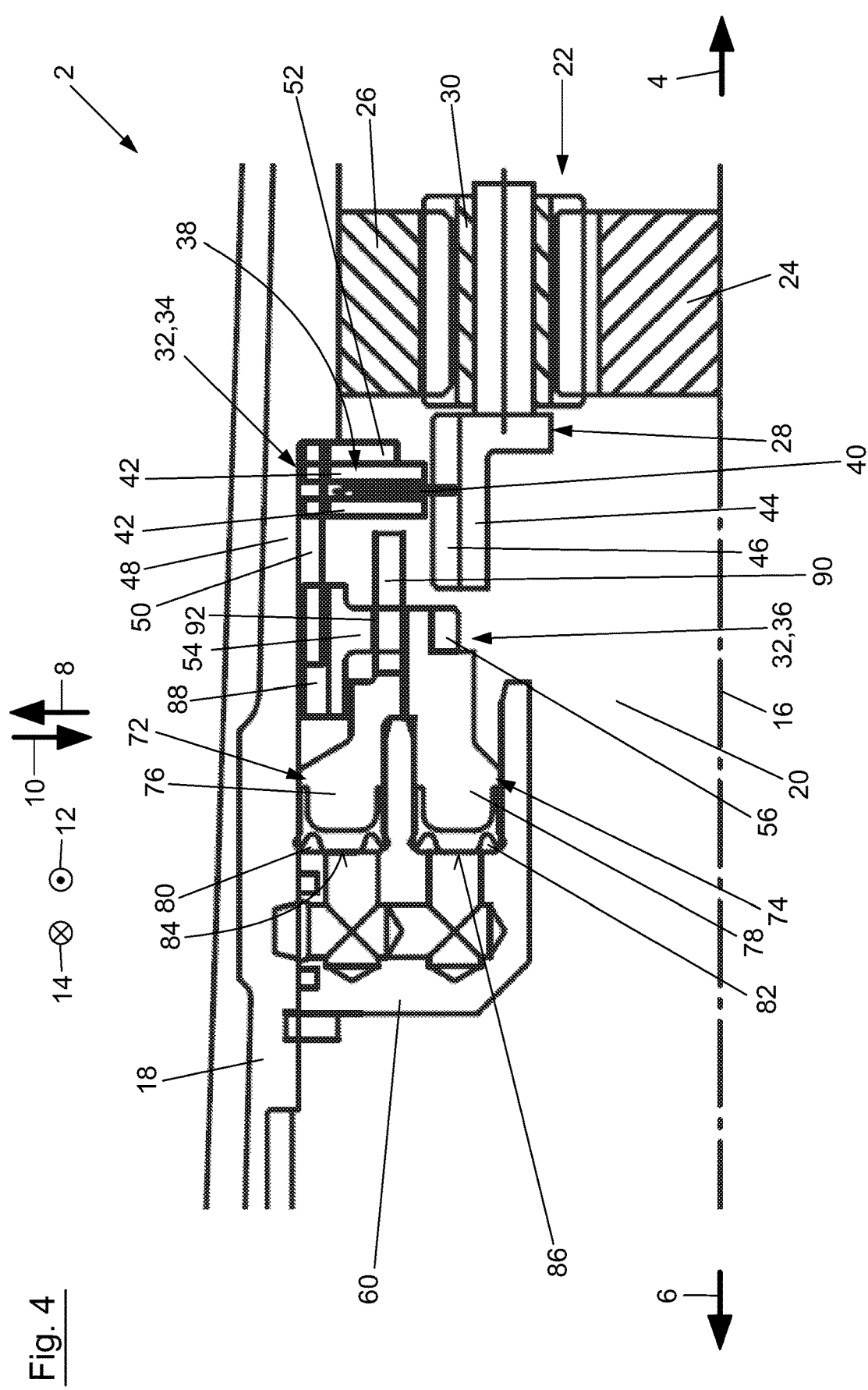
Figure 5:
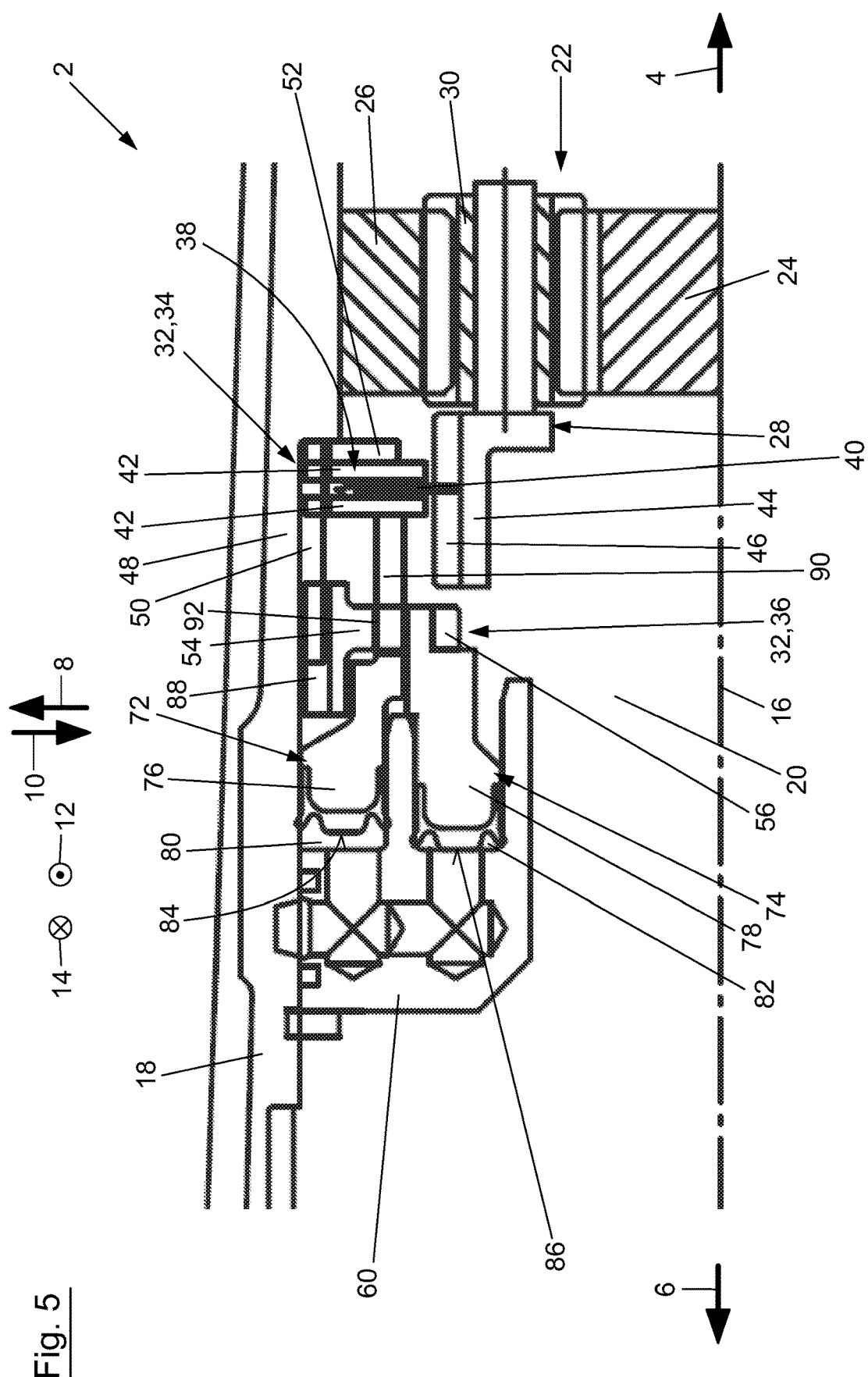
Figure 6:
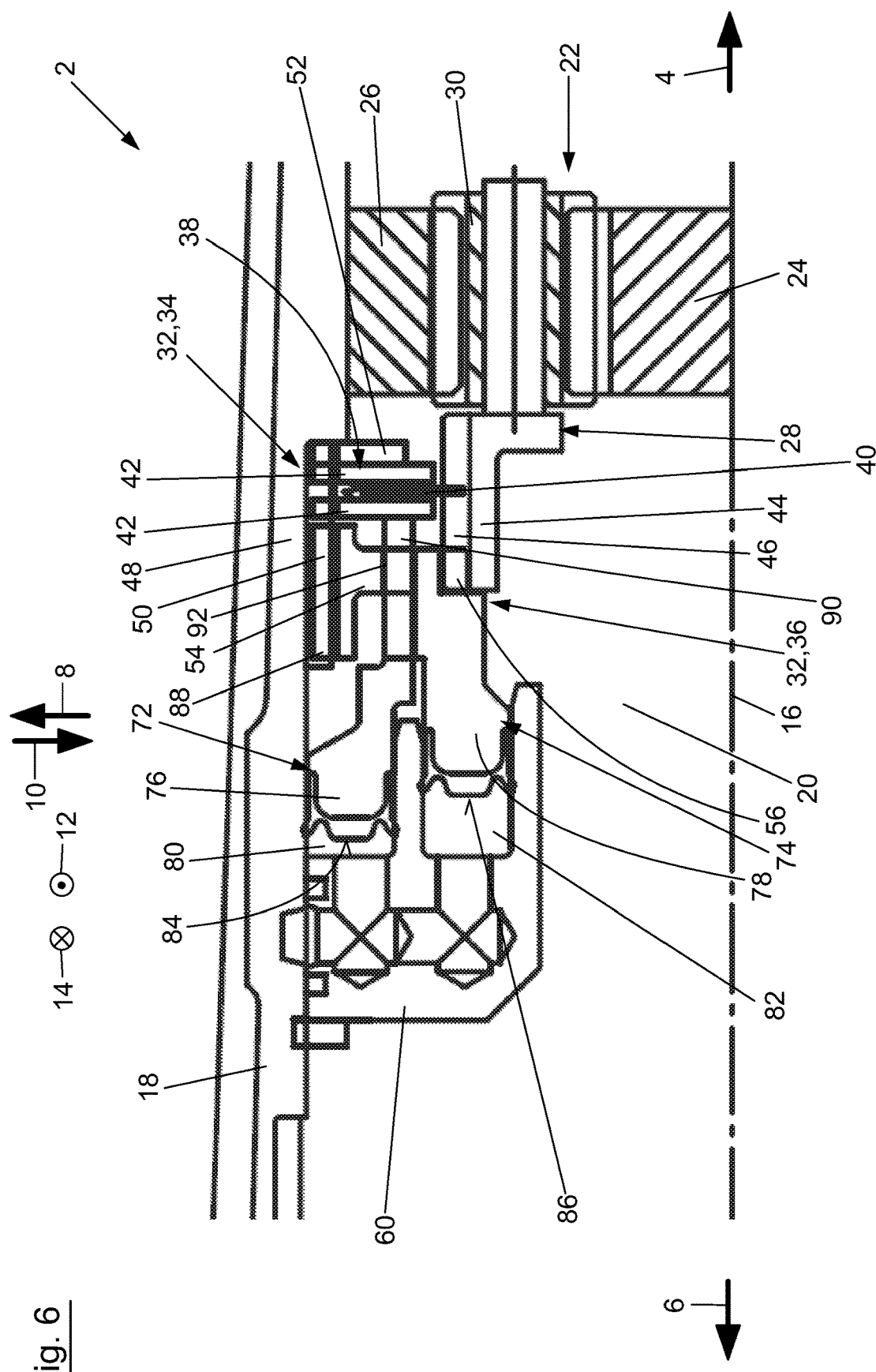
Figure 7:
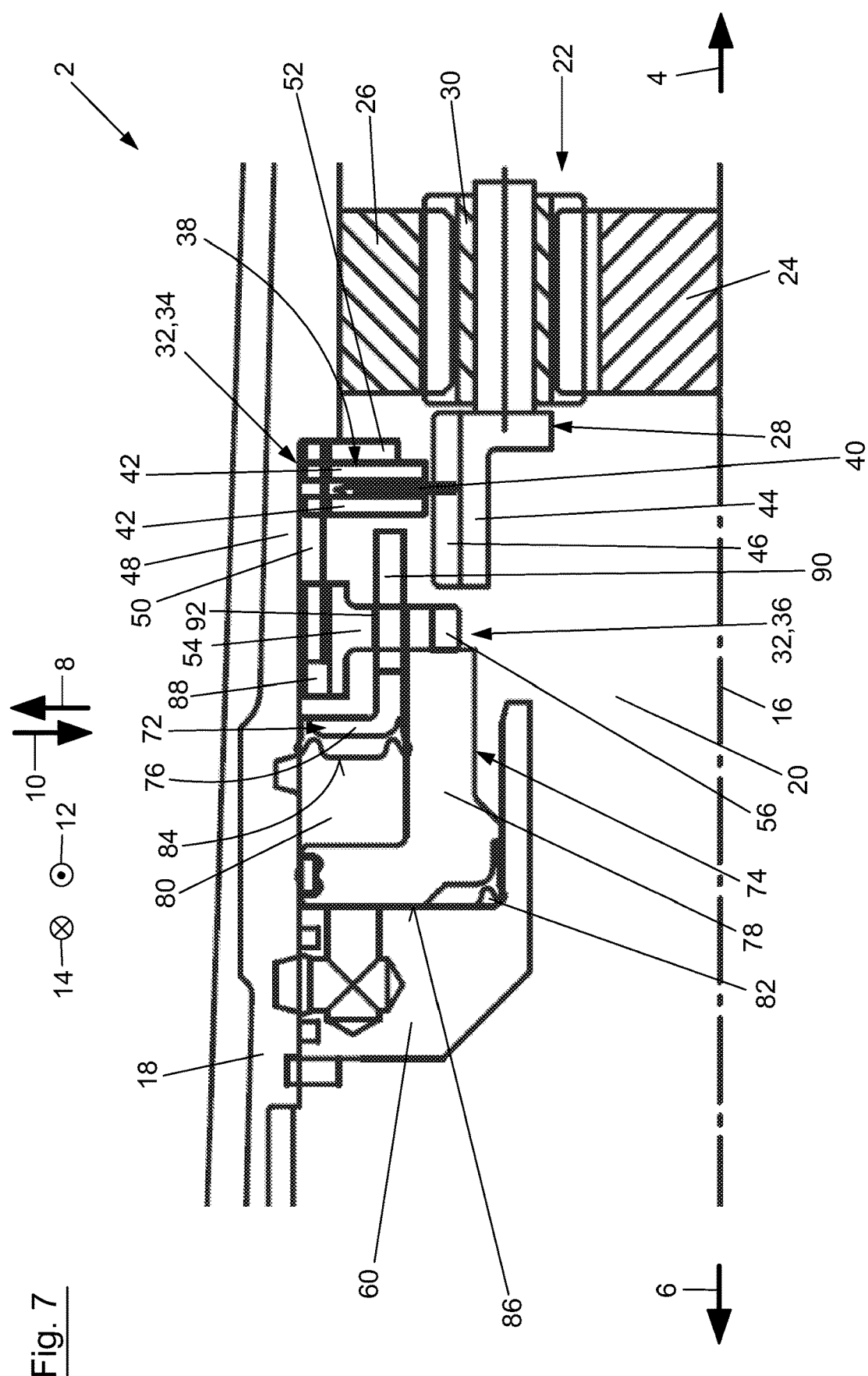
Figure 8:
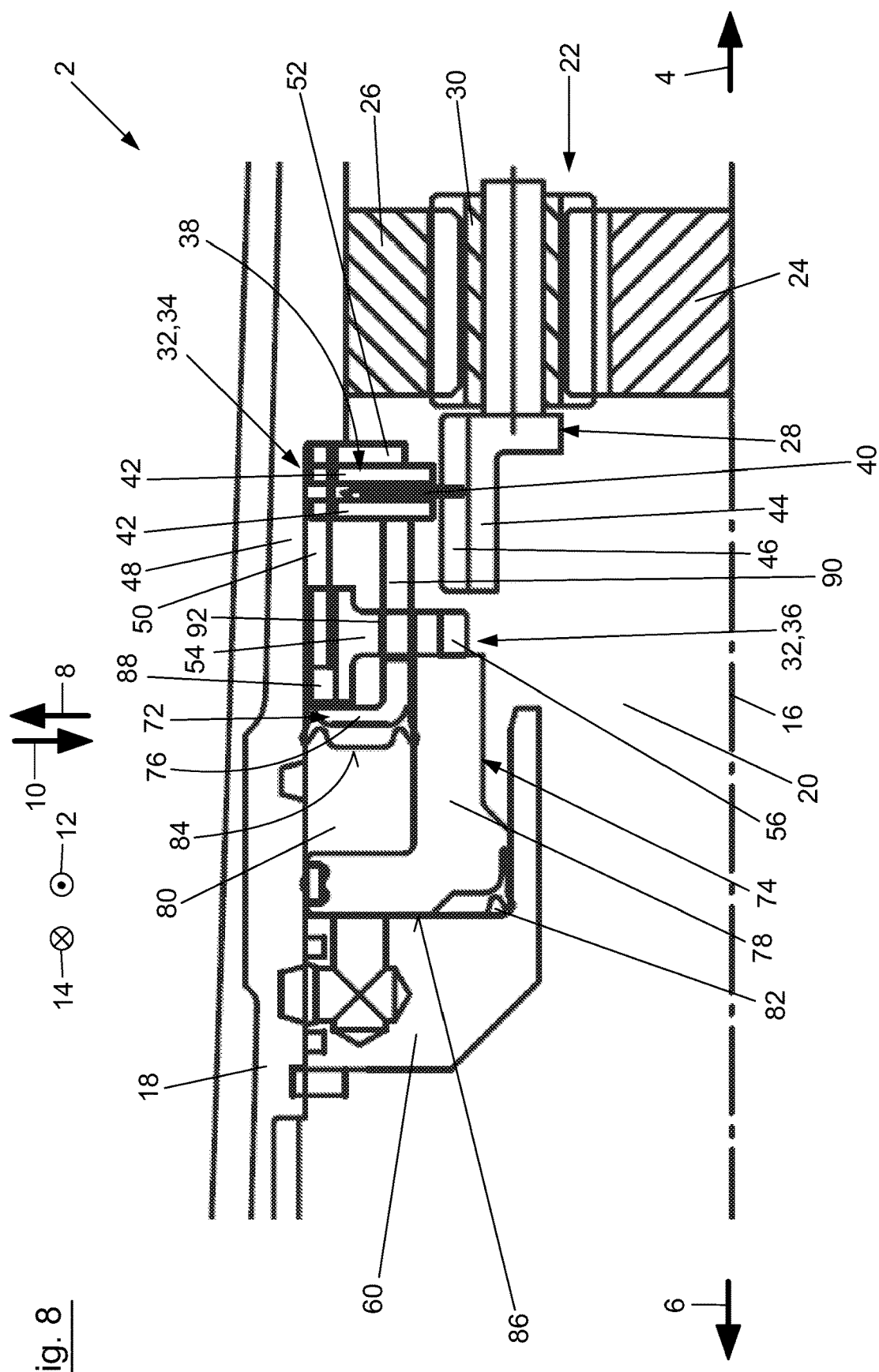
Figure 9:
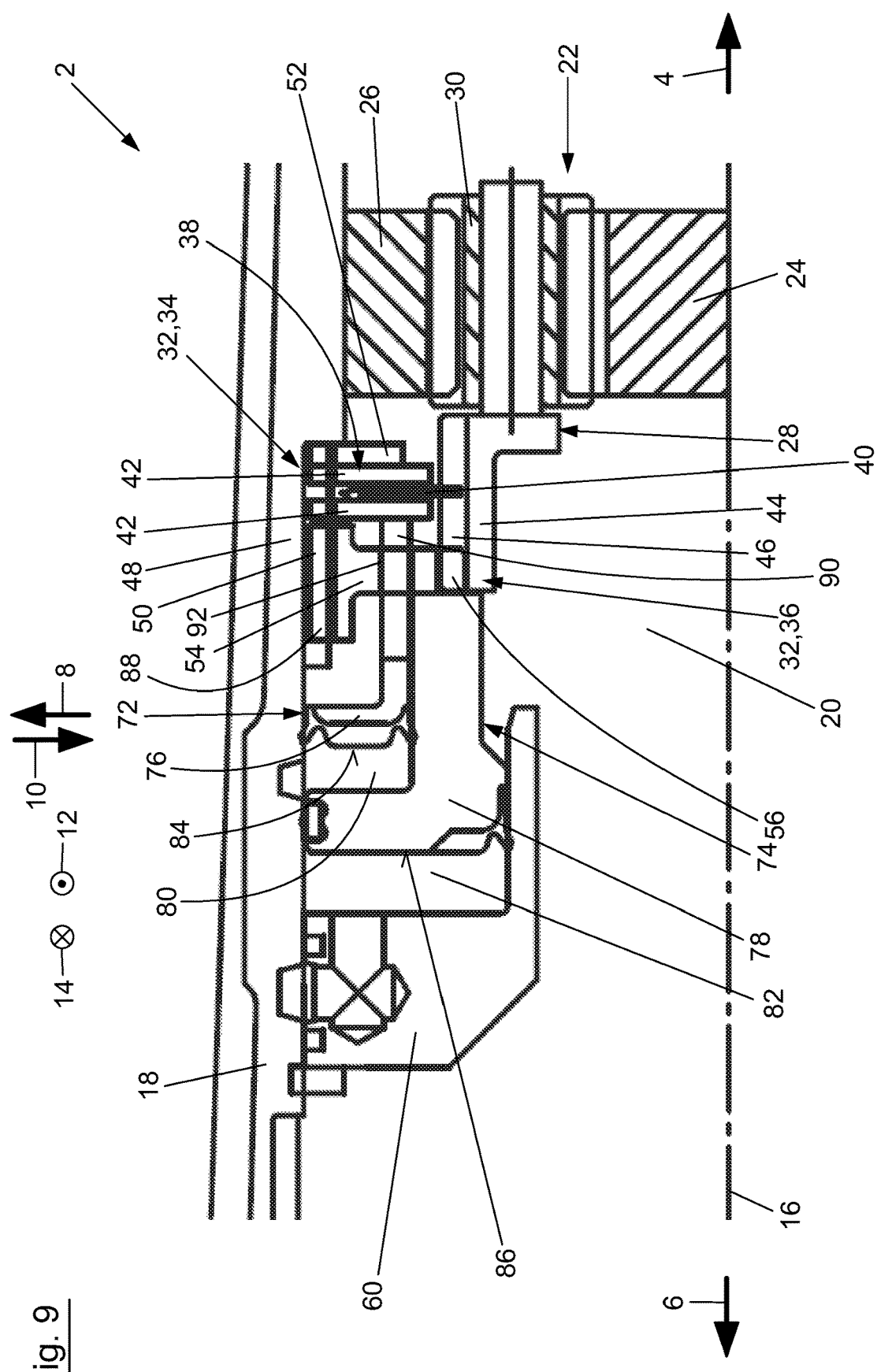
Figure 10:
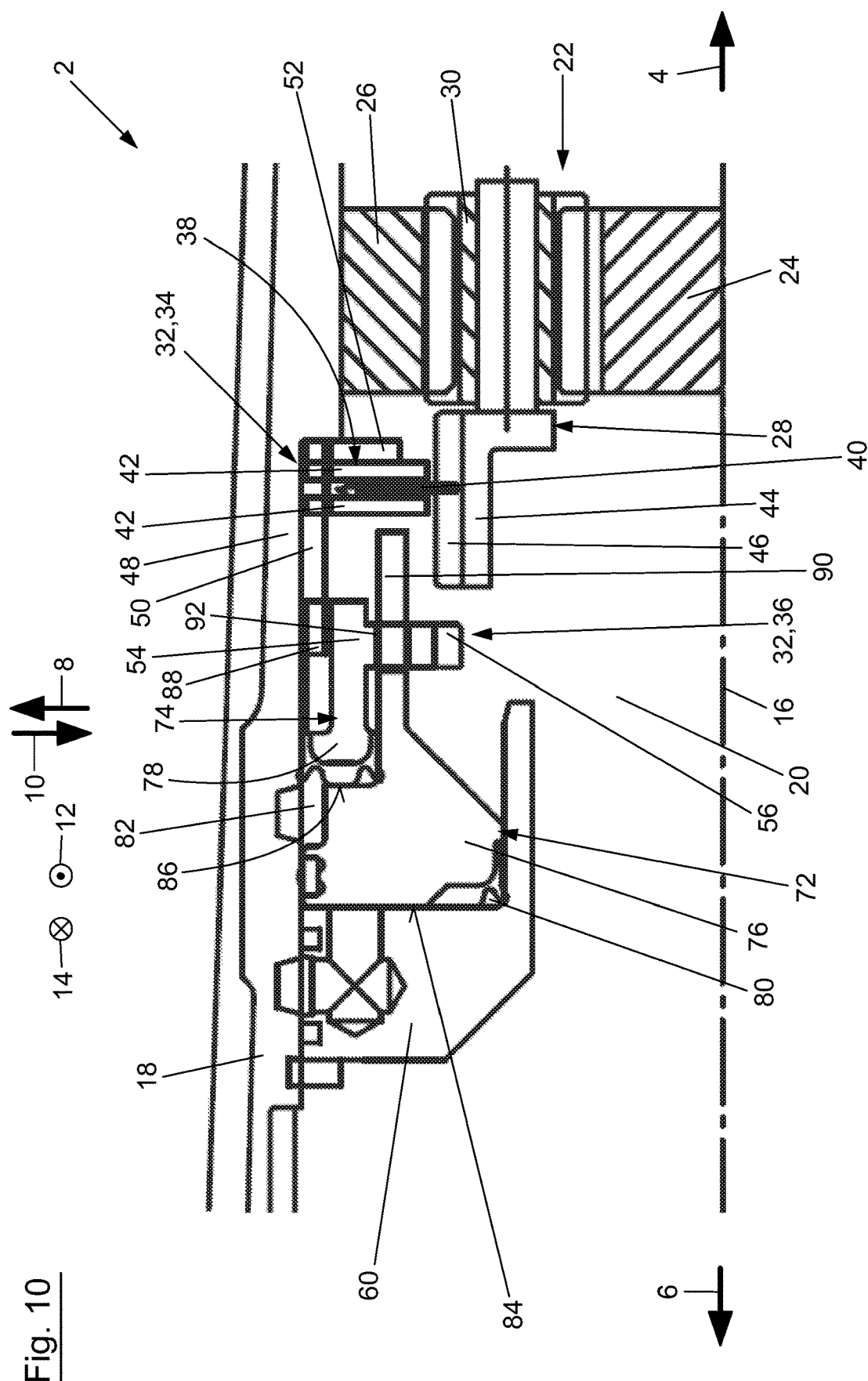
Figure 11:
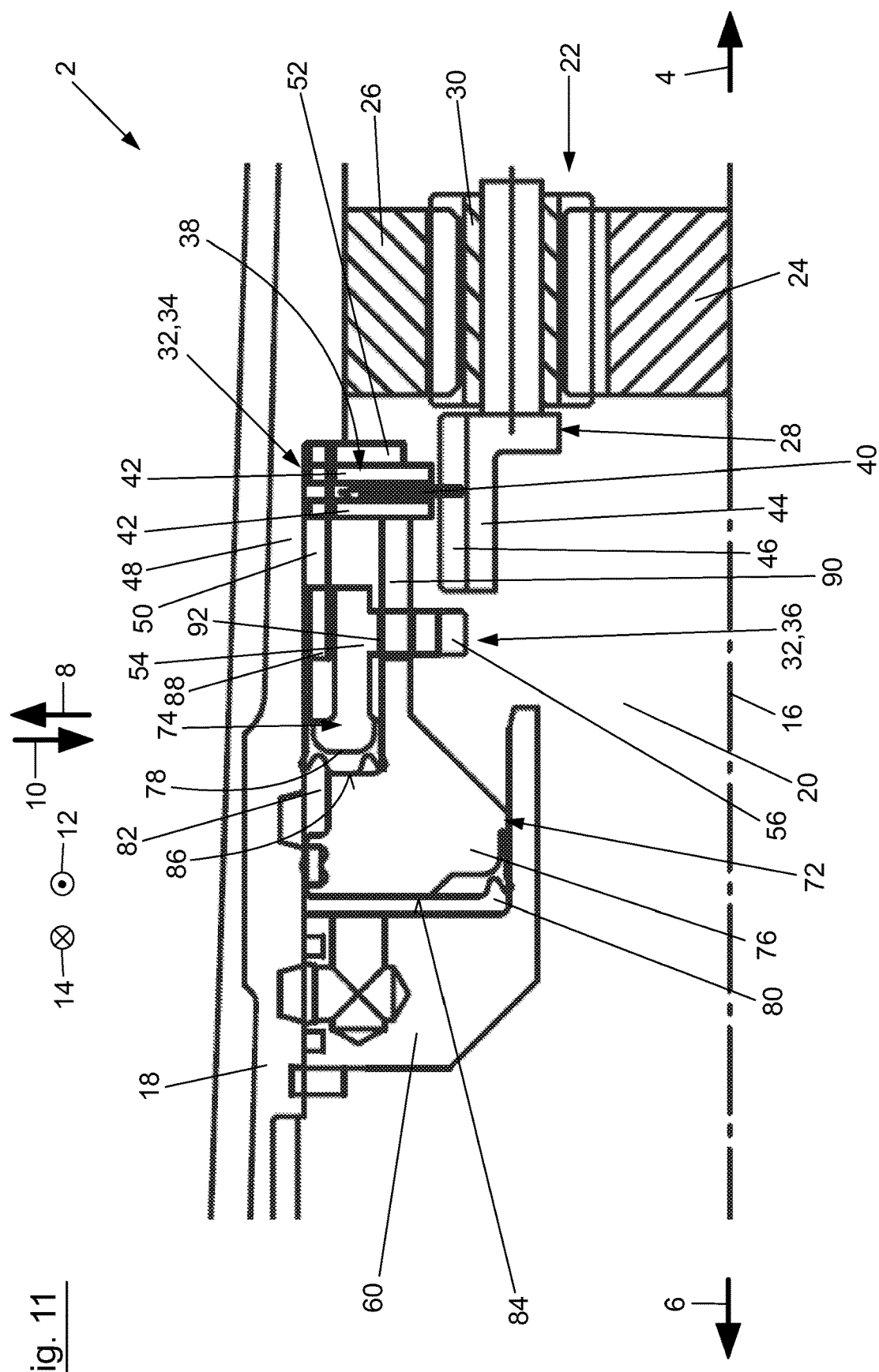
Figure 12:
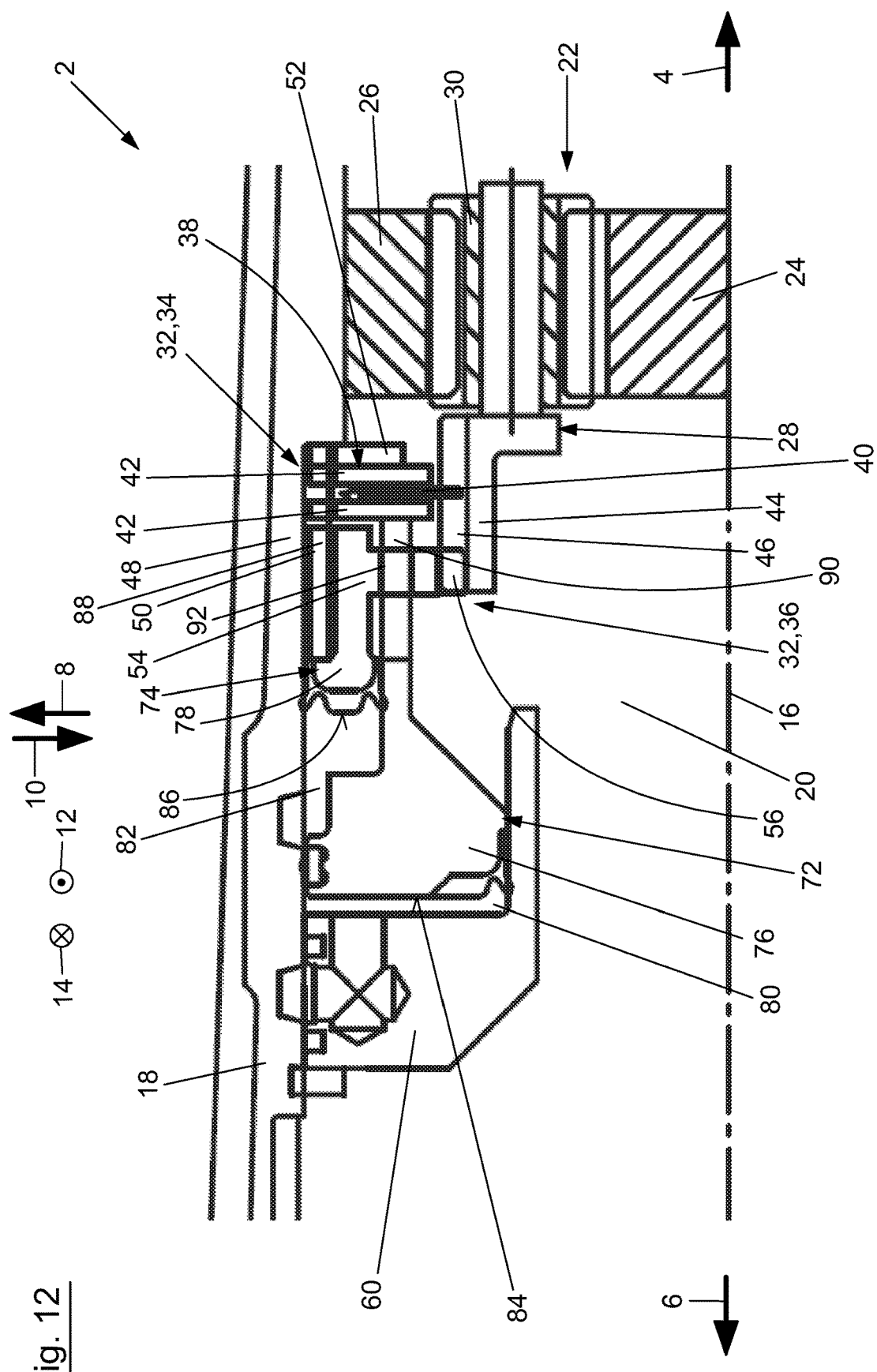

The invention will subsequently be explained in more detail by means of exemplary embodiments with reference to the accompanying drawings. As shown in:

FIG. 1 a partial side view of a first embodiment of the torque transmission device according to the invention in a cutaway presentation with the first and second clutches in the decoupled position, FIG. 2 the torque transmission device from FIG. 1 with the first clutch in the coupling position and the second clutch in the decoupled position, FIG. 3 the torque transmission device from FIG. 2 with the first and the second clutches in the coupling position, FIG. 4 a partial side view of a second embodiment of the torque transmission device according to the invention in a cutaway presentation with the first and second clutches in the decoupled position, FIG. 5 the torque transmission device from FIG. 4 with the first clutch in the coupling position and the second clutch in the decoupled position, FIG. 6 the torque transmission device from FIG. 5 with the first and the second clutches in the coupling position, FIG. 7 a partial side view of a third embodiment of the torque transmission device according to the invention in a cutaway presentation with the first and second clutches in the decoupled position, FIG. 8 the torque transmission device from FIG. 7 with the first clutch in the coupling position and the second clutch in the decoupled position, FIG. 9 the torque transmission device from FIG. 8 with the first and the second clutches in the coupling position, FIG. 10 a partial side view of a fourth embodiment of the torque transmission device according to the invention in a cutaway presentation with the first and second clutches in the decoupled position, FIG. 11 the torque transmission device from FIG. 10 with the first clutch in the coupling position and the second clutch in the decoupled position, FIG. 12 the torque transmission device from FIG. 11 with the first and the second clutches in the coupling position.

FIGS. 1 through 3 show a first embodiment of a torque transmission device 2 for an automatic transmission. In the figures, the opposite axial directions 4, 6, the opposite radial directions 8, 10, and the opposite circumferential directions 12, 14 of torque transmission device 2 are indicated by corresponding arrows, wherein torque transmission device has an axis of rotation 16 extending in axial directions 4, 6.

Torque transmission device 2 has a stationary housing 18 which is not rotatable about axis of rotation 16. Stationary housing 18 delimits a housing interior 20 outwardly in radial direction 8. A planetary gear train is arranged in housing interior 20. Planetary gear train 22 has a sun gear 24 lying inward in radial direction 10, a ring gear 26 arranged nested with sun gear 24 in radial direction 8, 10, and a planet gear carrier 28 on which the at least one planet gear 30 is rotatably arranged, wherein planet gear 30 is in rotary driving engagement with ring gear 26 outwardly in radial direction 8 and with sun gear 24 inwardly in radial direction 10. Both ring gear 26 and also planet gear carrier 28 are essentially designed as annular, consequently extending in circumferential directions 12, 14. Whereas planet gear carrier 28 is designed as a rotatable first component, ring gear 26 is designed as a second component connected rotationally fixedly to housing 18, which is consequently not rotatable about axis of rotation 16. Planet gear carrier 28 will therefore be subsequently referred to as first component 28, whereas ring gear 26 will be designated as second component 26 of planetary gear train 22.

A clutch device 32, which functions for selective coupling of first component 28 to stationary housing 18 and thus also to second component 26, is assigned to planetary gear train 22, wherein clutch device 32 is arranged on stationary housing 18. Clutch device 32 has a friction-locking first clutch 34 and a positive-locking second clutch 36, wherein these are arranged in such a way that first component 28 may be initially coupled to stationary housing 18 via first clutch 34 and subsequently by means of second clutch 36, as this will be described later in greater detail with reference to FIGS. 1 through 3. Subsequently, the structure of friction-locking first clutch 34 will be initially described.

First clutch 34 is designed as a disk clutch. Thus, first clutch 34 has a disk set 38 with a least one first disk 40, in this case an inner disk, and at least one second disk 42, in this case an outer disk. First and second disks 40, 42 follow alternating with one another in axial direction 4, 6. A first disk carrier 44, which is connected rotationally fixedly to first component 28 and has a first rotary driving contour 46 facing outward in radial direction 8, is provided on first component 28. First rotary driving contour 46 functions for achieving a rotary driving connection with the at least one first disk 40, wherein first disk 40 is additionally displaceable in axial direction 4, 6 relative to first disk carrier 44. In addition, first clutch 34 has a second disk carrier 48, which is connected rotationally fixedly to housing 18, in this case is designed as one piece with housing 18. Second disk carrier 48 has a second rotary driving contour 50 facing inward in radial direction 10, which functions for achieving a rotary driving connection with second disks 42, wherein second disks 42 are also displaceable in axial direction 4, 6 relative to second disk carrier 48. Disk set 38 is supported or supportable in axial direction 4 on housing 18 by means of an end plate 52.

Second clutch 36 has a movable coupling element 54, stated more precisely, a coupling element 54 displaceable in axial directions 4, 6. Coupling element 54 has a rotary driving contour 56, facing inward in radial direction 10 and open in axial direction 4, which may be brought into rotary driving engagement with first rotary driving contour 46 to achieve a positive lock between coupling element 54 and first disk carrier 44 on first component 28. Coupling element 54 is thereby designed as one piece with or as a section of a common actuating element 58 via which both first clutch 34 and also second clutch 36 are interdependently actuatable.

Common actuating element 58 is designed as a hydraulically drivable actuating piston. In addition, common actuating element 58 is designed as an annular piston extending in circumferential direction 12, 14. Common actuating element 58 is thereby arranged in a cylinder 60 which is connected rotationally fixedly to housing 18 on the one side via a toothing 62 and is rotationally fixed to common actuating element 58 on the other side via a toothing 64. Common actuating element 58 designed as an actuating piston is additionally arranged in cylinder 60 in such a way that a pressure chamber 66, which may be impinged with hydraulic pressure, and a counter pressure chamber 68, which may be impinged with hydraulic pressure, are formed, wherein pressure chamber 66 and counter pressure chamber 68 are assigned to common actuating element 58, in the form of the actuating piston, in opposing axial directions 4, 6.

FIG. 1 shows both first clutch 34 and also second clutch 36 in the decoupled position. If first component 28 is to be coupled to housing 18, then hydraulic pressure is applied to pressure chamber 66, whereupon common actuating element 58 is moved in axial direction 4 and a corresponding actuating force is exerted in axial direction 4. As is clear in FIG. 2, common actuating element 58 thereby initially presses on disk set 38 via a reset spring 70, by which means first clutch 34 is transitioned into the coupling position, if necessary by using slip. In contrast, second clutch 36 is still located in the decoupled position. As a result of the closing of first clutch 34, first component 28 is accordingly decelerated, adjusted in terms of speed to stationary housing 18.

If, in contrast, the actuating force of common actuating element 58 overcomes the reset force of reset spring 70, so that this is additionally compressed, then common actuating element 58 is further displaced in axial direction 4, wherein rotary driving contour 56 of coupling element 54 engages in first rotary driving contour 46 so that second clutch 36 also assumes its coupling position according to FIG. 3. Since coupling element 54 is connected rotationally fixedly to common actuating element 58, in this case is even designed as one piece with the same, first component 28 is coupled in a positive locking way to housing 18 via coupling element 54, common actuating element 58, and cylinder 60.

It is clear from the preceding description that, in the first embodiment, first and second clutch 34, 36 are interdependently actuatable, i.e., first clutch 34 must initially be closed before second clutch 36 may be transitioned into its coupling position. In order to transition both clutches 34, 36 back into the decoupled position according to FIG. 1, the previously described steps are carried out in reverse order.

FIGS. 4 through 6 show a second embodiment of torque transmission device 2, wherein subsequently only the differences from the first embodiment shall be addressed; identical reference numbers are used for identical or similar parts and the previous description correspondingly generally applies.

In the second embodiment, two actuating elements, namely a first actuating element 72, via which first clutch 34 may be actuated, and a second actuating element 74, via which second clutch 36 may be actuated, are used instead of a common actuating element 58. Both actuating elements 72, 74 are again designed as hydraulically actuatable actuating pistons, so that subsequently a first actuating piston 76 and a second actuating piston 78 will be discussed. Both actuating pistons 76, 78 are designed as annular pistons extending in circumferential direction 12, 14. Both actuating pistons 76, 78 are thereby arranged nested in radial direction 8, 10, wherein second actuating piston 78 is arranged in radial direction 10 within first actuating piston 76. Both actuating pistons 76, 78 are arranged in cylinder 60 so that a first pressure chamber 80, to which hydraulic pressure may be applied, is assigned to first actuating piston 76, whereas a second pressure chamber 82, to which hydraulic pressure may be applied, is assigned to second actuating piston 78. Hydraulic pressure may be applied independently to both pressure chambers 80, 82, so that first clutch 34 and second clutch 36 are also independently actuatable. In addition, first actuating piston 76 has a piston working surface 84, facing first pressure chamber 80 in axial direction 6 and upon which hydraulic pressure may be applied, which is designed as an annular surface based on the annular design of first actuating piston 76. This piston working surface 84 is thereby larger than piston working surface 86 of second actuating piston 78, upon which hydraulic pressure may be applied in second pressure chamber 82, and which is likewise annularly designed. This is advantageous inasmuch as second actuating piston 78 functions for actuating positive-locking second clutch 36, for which a lower actuating force is generally required to hold it in the coupling position.

Coupling element 54 is in turn designed as one piece with second actuating piston 78; however, it has, in addition to rotary driving contour 56 facing inward in radial direction 10, a rotary driving contour 88 facing outward in radial direction 8 and open in axial direction 4, which is designed on the end facing outward in radial direction 8 of coupling element 54 extending in radial direction 8, 10. This rotary driving contour 88 may be brought into rotary driving engagement with second rotary driving contour 50 of second disk carrier 48 on housing 18, or—as shown in FIG. 4—rotary driving contour is permanently in rotary driving engagement with second rotary driving contour 50, so that rotary driving contour 88, in conjunction with second rotary driving contour 50, functions equally as an axial guide for second actuating element 74 and coupling element 54 connected thereto, even if second clutch 36 has not yet been transitioned into its coupling position.

As is clear in FIG. 4, coupling element 54 is arranged in axial direction 4, 6 between first actuating element 72 and disk set 38 of first clutch 34. In order to still facilitate the transfer of the actuating force from first actuating element 72 in the shortest possible path to disk set 38, actuating fingers 90, projecting in axial direction 4 are provided on first actuating element 72 or first actuating piston 76, which extend in axial direction 4 through windows 92 in coupling element 54. Stated generally, first actuating element 72 thus extends through at least one window 92 in coupling element 54 to disk set 38 of second clutch 36.

In order to couple first component 28 to housing 18, hydraulic pressure is initially applied to first pressure chamber 80, whereupon first actuating piston 76 is moved in axial direction 4 in order to act on disk set 38 via actuating fingers 90 extending through windows 92 in coupling element 54, and first clutch 34 is closed in this way or is transitioned into its coupling position, which is shown in FIG. 5. Subsequently, second clutch 36 is transitioned into its coupling position, in that hydraulic pressure is applied to second pressure chamber 82. Coupling element 54 is thereby displaced in axial direction 4 by second actuating piston so that rotary driving contour 56 engages in second rotary driving contour 50, as this is clear in FIG. 6. In the coupling position of second clutch 36 according to FIG. 6, first disk carrier 44 and second disk carrier 48 are connected to one another in a positive locking way via coupling element 54.

A special feature of the second embodiment consists in that first and second clutches 34, 36 may be independently actuated. If first component 28 should not rotate, or rotate only at a low speed relative to housing 18, then a transition of first clutch 34 into its coupling position may in essence be omitted; instead, starting from FIG. 4, hydraulic pressure is applied only to second pressure chamber 82 in order to close second clutch 36 and thus to immediately achieve a positive locking connection between first component 28 and housing 18. Consequently, the positive locking may be achieved particularly quickly, which leads to time savings, in particular in the stopped state of a drivetrain.

FIGS. 7 through 9 show a third embodiment of torque transmission device 2, which corresponds substantially with the embodiment according to FIGS. 4 though 6, so that subsequently only the differences shall be addressed; identical reference numbers are used for identical or similar parts and the previous description correspondingly generally applies.

Whereas in the second embodiment, first pressure chamber 80 is delimited by cylinder 60 and housing 18, and second pressure chamber 82 is delimited exclusively by cylinder 60, a more compact design in the area of actuating pistons 76, 78 may be achieved in the third embodiment. As is clear in FIG. 7, first pressure chamber 80 is delimited at least partially by second actuating piston 78, in this case inwardly in radial direction 10 and laterally in axial direction 6. It may also be stated that first actuating piston 76 is arranged in a recess, extending in an annular shape or in circumferential direction 12, 14, in second actuating piston 78, or that first pressure chamber 80 is designed in such a recess.

To close first clutch 34, the hydraulic pressure is initially increased in first pressure chamber 80 (FIG. 8). Subsequently, the hydraulic pressure is increased in second pressure chamber 82 in order to transition second clutch 36 into its coupling position according to FIG. 9. Subsequently or parallel to this, the hydraulic pressure may be reduced again in first pressure chamber 80. In a closed second clutch 36 according to FIG. 9, the hydraulic pressure in first pressure chamber 80 may also be completely released, since a positive locking is already achieved via second clutch 36.

To open both clutches 34, 36, the hydraulic pressure in first pressure chamber 80 may be initially increased again, whereas the hydraulic pressure is reduced in second pressure chamber 82. Due to the increase of the hydraulic pressure within first pressure chamber 80, a reset force is generated acting on second actuating piston 78 in axial direction 6, so that second actuating piston 78 is forced back by this reset force into its initial position according to FIG. 7, whereas first actuating piston 76 may re-close first clutch 34 or hold it in the coupling position. To achieve a complete decoupling of first component 28 and housing 18, the hydraulic pressure need only be subsequently reduced in first pressure chamber 80, wherein reset elements, not depicted in greater detail, for example, reset springs acting between first actuating piston 76 and housing 18, may affect a displacement of first actuating piston 76 into its initial position according to FIG. 7.

FIGS. 10 through 12 show a fourth embodiment of torque transmission device 2, which corresponds substantially with the embodiment according to FIGS. 7 though 9, so that subsequently only the differences shall be addressed; identical reference numbers are used for identical or similar parts and the previous description correspondingly generally applies.

In the fourth embodiment, the two actuating pistons 76, 78 have exchanged positions in contrast to the third embodiment. Thus, second actuating piston 78 is arranged in an outer recess of first actuating piston 76 so that second pressure chamber 82, assigned to second actuating piston 78, is delimited by first actuating piston 76 inwardly in radial direction 10 and laterally in axial direction 6. Consequently, in this embodiment, a reset force acting on first actuating piston 76 in axial direction 4 may be generated by means of an increased hydraulic pressure within second pressure chamber 82. Also in contrast to the third embodiment, in the fourth embodiment according to FIGS. 10 through 12, the previously mentioned relationship between the piston working surfaces 84, 86 is again established, according to which piston working surface 86 is designed as smaller than piston working surface 84, particularly as the maintenance of the coupling position of positive-locking second clutch 36 necessitates a lower actuating force. Otherwise, second actuating piston 78 also interacts with coupling element 54, which again is designed as one piece with second actuating piston 78 and has the previously mentioned windows 92 through which actuating fingers 90 of first actuating piston 76 engage.

In the first, second, and fourth embodiments, coupling element 54 is designed as one piece with second actuating piston 78 or common actuating element 58. It should, however, be noted that coupling element 54 may also be designed in these embodiments as basically separate from second actuating piston 78 or common actuating element 58. In the third embodiment according to FIGS. 7 through 9, coupling element 54 is designed separately from second actuating piston 78 or second actuating element 74 in order to simplify assembly. Within the context of the assembly, however, separate coupling element 54 may also be fixed on second actuating element 74 after first actuating element 72 has been transitioned into its set position.

In addition, in the previously described embodiments, a reset device may be assigned to common actuating element 58 or to first actuating element 72 and/or second actuating element 74 for resetting the same, wherein the reset device preferably has at least one elastic reset element, particularly preferably a spring element. A depiction of the reset device was omitted, however, for reasons of clarity.

REFERENCE SIGN LIST

2 Torque transmission device
4 Axial direction
6 Axial direction
8 Radial direction
10 Radial direction
12 Circumferential direction
14 Circumferential direction
16 Axis of rotation
18 Housing
20 Housing interior
22 Planetary gear train
24 Sun gear
26 Ring gear/Second component
28 Planet gear carrier/First component
30 Planet gear
32 Clutch device
34 First clutch
36 Second clutch 38 Disk set
40 First disk
42 Second disk
44 First disk carrier
46 First rotary driving contour
48 Second disk carrier
50 Second rotary driving contour
52 End plate
54 Coupling element
56 Rotary driving contour
58 Common actuating element
60 Cylinder
62 Toothing
64 Toothing
66 Pressure chamber
68 Counter pressure chamber
70 Reset spring
72 First actuating element
74 Second actuating element
76 First actuating piston
78 Second actuating piston
80 First pressure chamber
82 Second pressure chamber
84 Piston working surface
86 Piston working surface
88 Rotary driving contour
90 Actuating finger
92 Windows

The invention claimed is:

1. A torque transmission device (2) comprising a planetary gear train (22), which has a rotatable component (28), a stationary housing (18), and a clutch device (32) for selective coupling of the component (28) with the stationary housing (18), characterized in that the clutch device (32) has a friction-locking first clutch (34) and a positive-locking second clutch (36), wherein the component (28) may be coupled to the stationary housing (18) via the first clutch (34) before a coupling by means of the second clutch (36), wherein the first and second clutches (34, 36) are actuatable via a common actuating element (58) or the first clutch (34) is actuatable via a first actuating element (72) and the second clutch (36) is actuatable via a second actuating element (74), wherein the common actuating element (58) is designed as a hydraulically drivable actuating piston or the first actuating element (72) and the second actuating element (74) are designed as hydraulically drivable actuating pistons (76, 78), and wherein a first pressure chamber (80) is assigned to the first actuating piston (76) and a second pressure chamber (82) is assigned to the second actuating piston (78), wherein the first pressure chamber (80) is delimited at least partially by the second actuating piston (78) and a reset force may be generated on the second actuating piston (78) by means of a hydraulic pressure within the first pressure chamber (80), or the second pressure chamber (82) is at least partially delimited by the first actuating piston (76) and a reset force on the first actuating piston (76) may be generated by means of a hydraulic pressure within the second pressure chamber (82).

2. The torque transmission device (2) according to claim 1, characterized in that the first clutch (34) and the second clutch (36) are independently or interdependently actuatable.

3. The torque transmission device (2) according to claim 1, characterized in that the first actuating piston (76) and the second actuating piston (78) are arranged radially nested, and/or aligned flush with one another in axial direction (4, 6), and/or the first actuating piston (76) and/or the second actuating piston (78) is designed as an annular piston.

4. The torque transmission device (2) according to claim 1, characterized in that a reset device is assigned to the common actuating element (58) or the first actuating element (72) and/or the second actuating element (74) to reset the same, wherein the reset device has at least one elastic reset element.

5. The torque transmission device (2) according to claim 4, characterized in that the at least one elastic reset element is a spring element.

6. The torque transmission device (2) according to claim 1, characterized in that the first clutch (34) is a disk clutch comprising a disk set (38), a first disk carrier (44) is connected rotationally fixedly to the component (28), and a second disk carrier (48) is connected rotationally fixedly to the housing (18), wherein the first disk carrier (44) has a first rotary spline (46) for first disks (40) of the disk set (38) and the second disk carrier (48) has a second rotary spline (50) for second disks (42) of the disk set (38).

7. The torque transmission device (2) according to claim 6, characterized in that the second clutch (36) has a movable coupling element (54) which may be brought into rotary driving engagement with the first or the second rotary spline (46; 50), and, is permanently in rotary driving engagement with the second or first rotary spline (50; 46), or is designed as one piece with the second actuating element (74) or the common actuating element (58).

8. The torque transmission device (2) according to claim 7, characterized in that the coupling element (54) is arranged between the first actuating element (72) and the disk set (38), wherein the first actuating element (72) extends to the disk set (38) through at least one window (92) in the coupling element (54), and the first actuating element (72) has multiple actuating fingers (90) extending through the at least one window (92) in the coupling element (54).

9. The torque transmission device (2) according to claim 7, characterized in that the coupling element (54) is connected rotationally fixedly to the second actuating element (74) or to the common actuating element (58).

10. The torque transmission device (2) according to claim 9, characterized in that the component (28) is coupled to the housing (18) via the coupling element (54) and the second or the common actuating element (74, 58).

11. The torque transmission device (2) according to claim 1, characterized in that the planetary gear train (22) has a sun gear (24), a ring gear (26), and a planet gear carrier (28) with at least one planet gear (30) which is in rotary driving engagement with the sun gear (24) and the ring gear (26), wherein the sun gear (24), the ring gear (26), or the planet gear carrier (28) forms the component (28).

12. The torque transmission device (2) according to claim 11, characterized in that a second component (26) is rotationally fixedly to the housing (18), wherein the second component (26) is formed by the ring gear (26).

13. The torque transmission device (2) according to claim 1, characterized in that the first actuating piston (76) has a piston working surface (84), on which hydraulic pressure may be applied, which is designed to be larger than a piston working surface (86) of the second actuating piston (78), on which hydraulic pressure may be applied.

14. A torque transmission device (2) comprising a planetary gear train (22), which has a rotatable component (28), a stationary housing (18), and a clutch device (32) for selective coupling of the component (28) with the stationary housing (18), characterized in that the clutch device (32) has a friction-locking first clutch (34) and a positive-locking second clutch (36), wherein the component (28) may be coupled to the stationary housing (18) via the first clutch (34) before a coupling by means of the second clutch (36), wherein the first clutch (34) is a disk clutch comprising a disk set (38), a first disk carrier (44) is connected rotationally fixedly to the component (28), and a second disk carrier (48) is connected rotationally fixedly to the housing (18), wherein the first disk carrier (44) has a first rotary spline (46) for first disks (40) of the disk set (38) and the second disk carrier (48) has a second rotary spline (50) for second disks (42) of the disk set (38), and wherein the second clutch (36) has a movable coupling element (54) which may be brought into rotary driving engagement with the first or the second rotary spline (46; 50), and, is permanently in rotary driving engagement with the second or first rotary spline (50; 46), or is designed as one piece with the second actuating element (74) or the common actuating element (58).

15. The torque transmission device (2) according to claim 14, characterized in that the coupling element (54) is arranged between the first actuating element (72) and the disk set (38), wherein the first actuating element (72) extends to the disk set (38) through at least one window (92) in the coupling element (54), and the first actuating element (72) has multiple actuating fingers (90) extending through the at least one window (92) in the coupling element (54).

16. The torque transmission device (2) according to claim 14, characterized in that the coupling element (54) is connected rotationally fixedly to the second actuating element (74) or to the common actuating element (58).

17. The torque transmission device (2) according to claim 16, characterized in that the component (28) is coupled to the housing (18) via the coupling element (54) and the second or the common actuating element (74, 58).

18. A torque transmission device (2) comprising a planetary gear train (22), which has a rotatable component (28), a stationary housing (18), and a clutch device (32) for selective coupling of the component (28) with the stationary housing (18), characterized in that the clutch device (32) has a friction-locking first clutch (34) and a positive-locking second clutch (36), wherein the component (28) may be coupled to the stationary housing (18) via the first clutch (34) before a coupling by means of the second clutch (36), wherein the planetary gear train (22) has a sun gear (24), a ring gear (26), and a planet gear carrier (28) with at least one planet gear (30) which is in rotary driving engagement with the sun gear (24) and the ring gear (26), wherein the sun gear (24), the ring gear (26), or the planet gear carrier (28) forms the component (28), and wherein a second component (26) is rotationally fixedly to the housing (18), wherein the second component (26) is formed by the ring gear (26).

* * * * *